Oct. 15, 1940.  F. A. SMITH  2,217,775
HUB CAP LOCK
Filed March 14, 1932  2 Sheets-Sheet 1
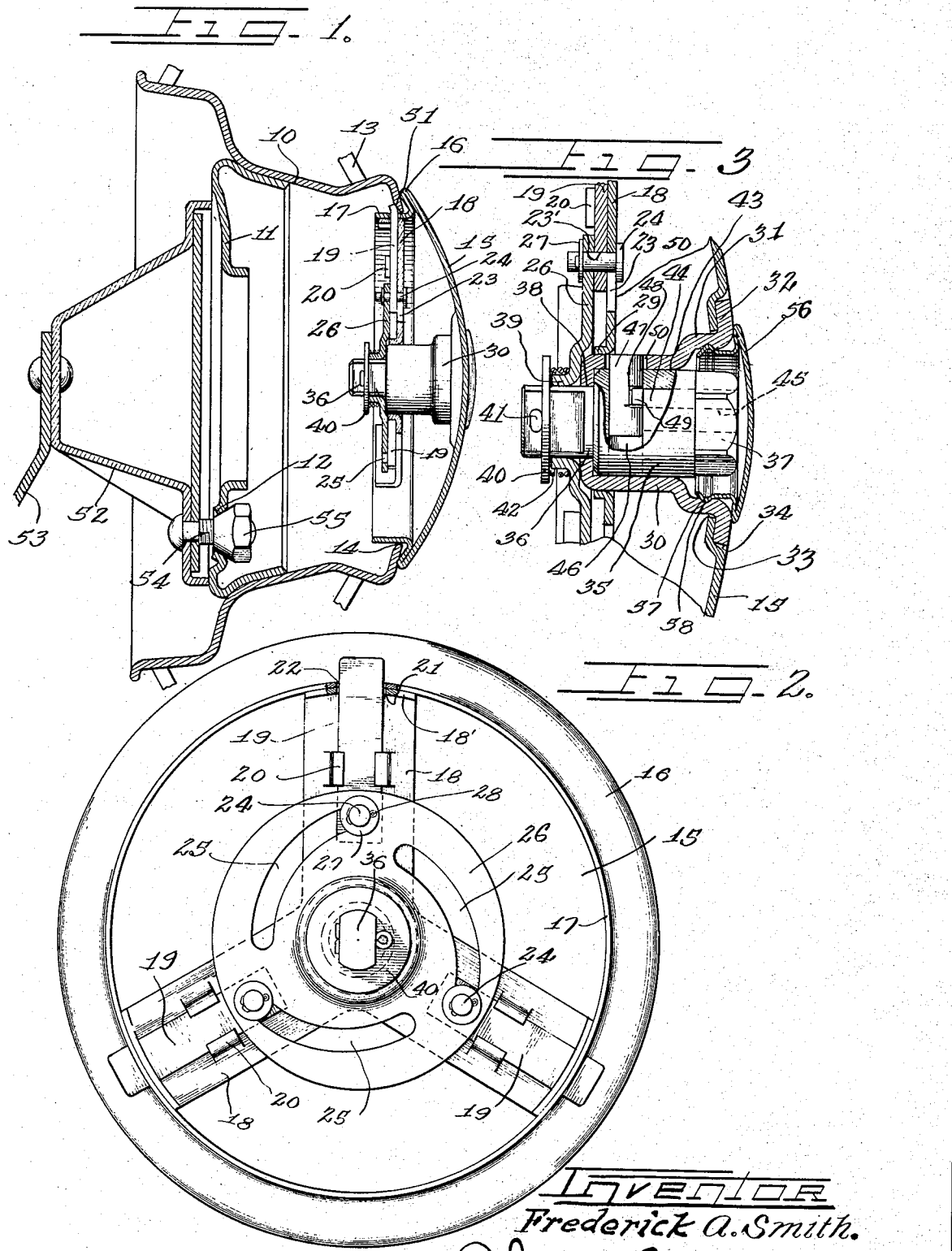
Inventor
Frederick A. Smith.

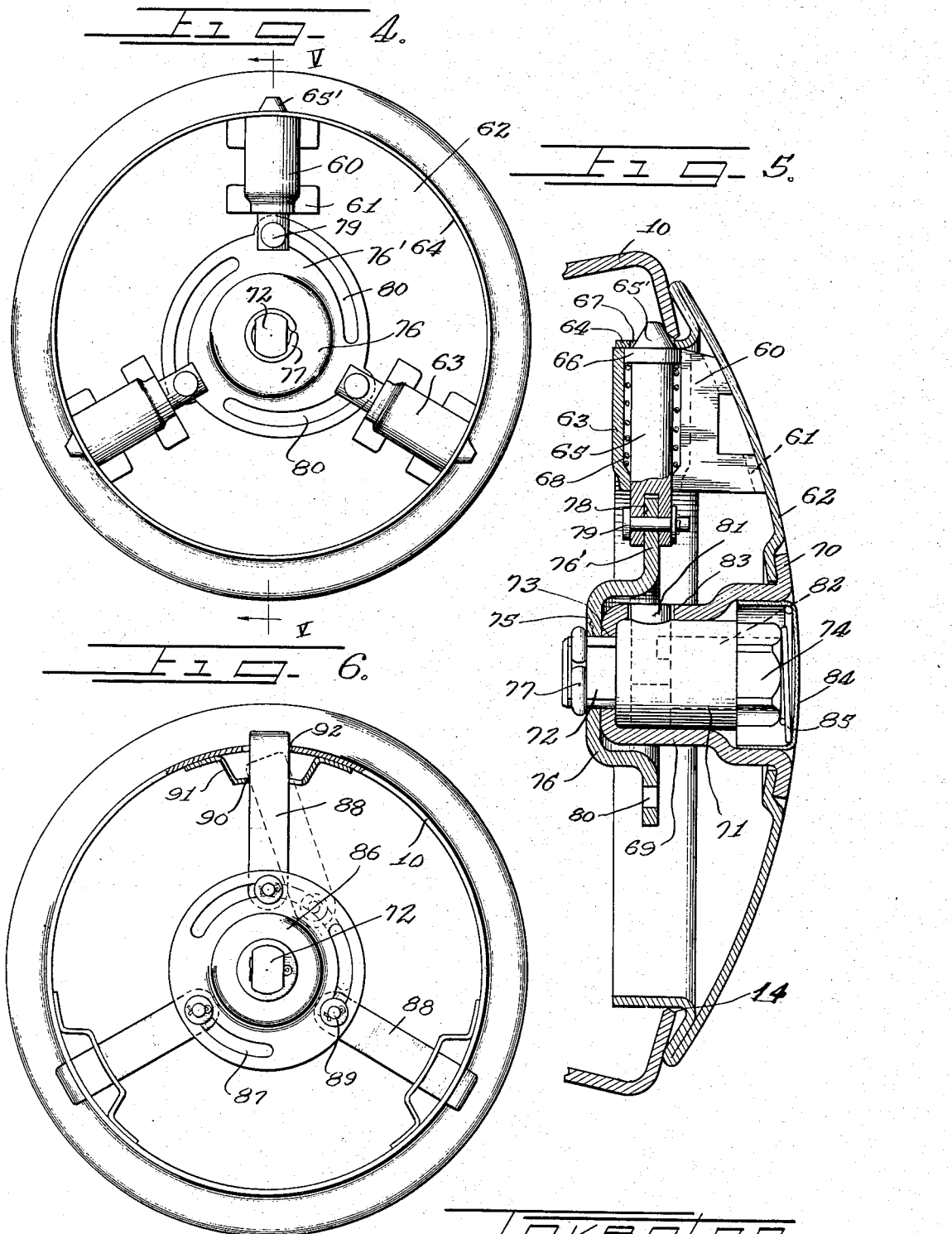

Patented Oct. 15, 1940

2,217,775

UNITED STATES PATENT OFFICE 2,217,775

HUB CAP LOCK

Frederick A. Smith, North Chicago, Ill., assignor, by mesne assignments, to Houdaille-Hershey Corporation, Detroit, Mich., a corporation of Michigan Application March 14, 1932, Serial No. 598,554

4 Claims. (Cl. 70—168)

My invention relates to the locking of hub caps to wheels of automobile vehicles. Locking of the hub caps serves double purposes. It locks the caps against theft off the wheels, and where the securing means for securing the wheels to the vehicle for service or to a spare wheel carrier are within the wheel hub, the locking of the cap to a wheel will prevent theft of the wheel and will also eliminate the need of special locking means within the wheel hub.

The object of the invention is to provide improved economically manufactured and efficient locking means for cap structures and with the locking means key controlled.

Referring to the drawings,

Figure 1 is a diametral section of the hub structure of a wheel and a spare wheel carrier element;

Figure 2 is an enlarged inner view of the cap structure;

Figure 3 is an enlarged sectional view of the cap structure;

Figure 4 is an inner view of a cap structure showing a modified arrangement of locking means;

Figure 5 is an enlarged section on plane V—V of Figure 4; and

Figure 6 is an inner view of a modified form of cap structure and locking means.

The hub structure shown comprises the hub frame 10 of sheet metal which has the inner bolt flange or wall structure 11 secured thereto and provided with holes 12 for receiving the bolts which secure the wheel structure to the vehicle. Spokes 13 extend from the hub body for supporting the tire receiving rim (not shown) in a manner well understood in the art.

The hub body has the opening 14 in its outer wall through which the wheel securing bolts are accessible. A cap or closure structure is usually provided for this opening to close the opening and to form a finished appearance for the hub-structure.

The cap structure shown has the outwardly convex body 15 and may be formed of sheet metal, the metal along the periphery being crimped and folded to form the seating flange 16 and the axially extending interlocking flange 17. This flange 17 fits and enters through the opening 14 and the flange 16 abuts against the outer wall of the hub body around the opening. A plurality of L-shaped brackets 18 are secured to the flange 17 by their bases 18' which may be intimately secured to the flange as by spot welding. Operable on each bracket is a detent or wedge bar 19 which at its inner end is guided by ears 20 formed by deflecting the metal of the bracket and which at its outer end is guided by passage through a slot 21 in the base 18' of the bracket, the flange 17 having the slots 22 in alignment with the slots through the bracket bases. Each bracket 18 inwardly of the guide ears 20 thereon has a radially extending slot 23 for receiving the shank of a pin 24 which extends through a hole 23' at the lower end of the corresponding bar 19 in which hole the pin securely fits, the head of the pin abutting against the inner side of the bracket. The outer ends of the pins extend respectively through cam slots 25 in a circular disc 26, the disc being held in place by washers 27 held against the outer face of the disc as by cotter pins 28 extending through the pins. I have shown three brackets 18 and consequently three cam slots equally spaced and upon rotation of the disc 26 the engagement of the pins 24 in the cam slots will cause the locking bars 19 to be shifted radially either to locking or unlocking position.

The bracket members 18 at their inner ends are deflected outwardly to form circumferentially extending flanges 29 which together form a cylindrical bearing and support for the inner end of a lock housing 30. This housing may be of circular cross section and has the outer section 31 of enlarged diameter whose outer section is deflected radially outwardly to form an abutting flange 32. The housing is inserted through an opening 33 in the cap which opening is concentric with the cap axis and the metal of the cap around the opening is preferably off set inwardly to form a recess 34 in which the flange 32 of the lock housing may seat to have its outer face flush with the outer face of the cap and to make a neat appearance. The flange 32 is secured to the cap as by spot welding and the flanges 29 on the brackets 18 may also be secured to the lock housing as by welding.

Journaled in the housing 30 is a cylindrical head 35 forming a lock cylinder and having a cylindrical stud 36 extending from the inner end thereof concentric therewith, the outer section 37 of this head which is within the enlarged part 31 of the housing 30 being polygonal, as for example hexagonal, for the application of a wrench or other suitable tool by which the head may be turned. The inner or bottom wall of the housing 30 has the cylindrical passageway 38 through which the lug 36 extends. The outer end of the lug 36 is slabbed or milled off on opposite sides so as to be polygonal and in the cam disc 26 is provided a correspondingly shaped opening 39 and the metal of the disc around the opening is deflected inwardly to form an extended support for the lug. The end of the lug receives a washer 40 which is held in place by a cotter pin 41, and a spring 42 is preferably inserted between the washer and the disc for holding the disc in bearing engagement with the adjacent end of the housing 30. With this arrangement as the head 35 is turned the disc 26 turns therewith and controls the movement of the locking bars 19.

The head 35 has the longitudinal bore 43 extending therein from the outer end thereof for journaling a lock barrel 44 which has the keyhole 45 and the usual tumbler mechanism (not shown) controlled by the key for releasing or locking the barrel. At the bottom of the cylindrical bore 43 extends a transverse passageway 46 for a lock bolt 47 which has the side slot 48 for receiving the cam pin 49 extending from the inner end of the lock barrel at one side of its axis. In the wall of the housing 30 is the hole 50 for receiving the end of the projected bolt 47. This hole is positioned to receive the bolt when the cam disc 26 has been rotated to shift the locking bars 19 to their outer or locking positions, the locking bars being then locked in their locking positions. To release the cam disc for rotation to unlock the bars 19 the key must be inserted in the lock barrel and the barrel turned to cause withdrawal of the bolt 47 from the locking hole 50.

When the locking bars are drawn inwardly their outer ends will be within the slots 22 in the flange 17 of the cap structure and then the cap flange may be inserted through the opening 14 of the hub body 10. After such insertion a tool is applied to the polygonal end of the head 35 and the head is rotated for operation of the cam disc 26 to shift the lock bars outwardly with their outer ends behind the hub wall which surrounds the opening 14. In order to obtain a wedging engagement the hub wall around the opening 14 is beveled as indicated at 51 and the outer ends of the bars may also be beveled so that as they are shifted outwardly the engagement of the beveled edges will draw the periphery 16 of the cap securely against the hub to prevent rattling of the cap structure and also to resist the insertion of an implement between the cap and hub body for forcibly removing the cap.

When the locked cap structure is associated with wheels whose securing bolts are on the inside of the hub, the locked cap structure will prevent access to such bolts whether the wheel is in service on a vehicle or whether it is mounted on a spare wheel carrier structure. On Figure 1 I have shown a carrier body 52 secured as by means of a bracket 53 to a vehicle body. The carrier has screw studs 54 extending therefrom to be in alignment with the bolt holes in the bolt flange 11 of the wheel hub and when the wheel is applied to the carrier nuts 55 may be applied to a number of these studs to secure the wheel to the carrier. Then when the cap structure is locked in place access to the nuts will be prevented and the wheel will be secured against theft. The locking of the cap to the wheel also prevents theft of the cap.

To hide the outer end of the locking controlling head 35, and to give a more finished appearance to the cap structure, a sheet metal plug or cup 56 may be provided for insertion in the enlarged end 31 of the housing 30 and to lock the plug its flange may be provided with an annular bead 57 for snapping into the annular groove 58 provided in the wall of the housing part 31. In the modified arrangement of Figures 4 and 5 a number of bracket structures 60 are secured by their feet 61 directly to the convex wall of the cap 62 and each bracket provides a cylindrical barrel 63 extending radially, three brackets being shown. The brackets abut at their outer ends against the lock flange 64 on the cap structure. In the barrel of each bracket structure is a lock pin or plunger 65 having a conical outer end 65' and an abutment collar 66 secured just within such end. At each bracket structure the flange 64 has a hole 67 through which the plunger end may extend for engagement with the hub body wall surrounding the opening 14. In each barrel is a spring 68 encircling the plunger and abutting against the collar 66 and the inner end of the barrel, these springs tending to shift the lock plungers outwardly until their abutment collars 66 abut the flange 64.

A cylindrical lock housing 69 extends axially inwardly from the cap structure wall 62 and is secured as by spot welding its outer flange 70 to the cap wall. The housing journals a lock cylinder 71 having the polygonal stud 72 extending inwardly therefrom through the cylindrical passageway 73 in the inner wall of the housing 69 and the outer end of the lock cylinder has the polygonal head 74 for receiving a wrench or other tool.

The polygonal lug 72 extends through a correspondingly shaped opening 75 in a cam member 76 which may be formed of sheet metal. This cam member abuts the rear end of the housing 69 and is held in place by a ring washer 77 clamped to the lug 72. The cam member is deflected so that its outer section 76' is in a plane in alignment with the lock plungers 65, each lock plunger having a longitudinal slot 78 receiving the cam member section 76'. A pin 79 extends through the slotted end of each plunger and through one of the cam slots 80 cut in the outer part 76' of the cam member 76 and with this arrangement turning of the lock cylinder 71 results in radial shift of the locking plungers 65, inward shifting of the plungers being resisted by the springs 68.

To lock the plungers in extended or locking position the lock bolt 81 is provided in the lock cylinder 71 and this bolt is shiftable by a lock barrel 82 whose rotation is controlled by a suitable key. The housing 69 has the lock hole 83 which will be in alignment with the bolt 81 when the lock plungers are in outer or locking position and by then turning the lock the bolt 81 will be projected into the hole 83 and turning of the lock cylinder 71 and retraction of the lock plungers will be prevented. When the cap is to be withdrawn the key is inserted in the lock and turned to withdraw the bolt 81 from the hole 83 and then turning of the lock cylinder 71 will withdraw the lock plungers to release the cap.

To cover up the outer end of the housing 69 a sheet metal cup 84 is inserted and a spring 85 may be interposed between the cup and the lock cylinder 71 to prevent rattling of the lock cylinder.

In the modified arrangement shown in Figure 6 the lug 72 on the lock cylinder supports a circular disc 86 having slots 87 which are concentric with the disc. For each slot there is a locking bar 88 having a pin 89 extending through the slot and the outer end of each bar extends through a guide passage 90 in a bracket 91 secured to the flange 10 of the cap, the flange having opposite each of the passageways 90 a slot 92 for receiving the outer ends of the respective bars. When the lock cylinder 71 is turned the disc 86 turns therewith and as soon as the ends of the slots 87 reach the pins of the lock bars the lock bars will be canted and shifted either to locking or unlocking position, as shown by the dotted lines in Figure 6.

I have shown practical and efficient embodiments of my invention but I do not desire to be limited to the exact construction and arrangement shown and described as changes and modifications may be made without departing from the scope of the invention as defined in the appended claims.

I claim as follows:

1. In combination with a wheel hub of a closure cap therefor, radially shiftable lock bars mounted on said cap, a cam disc having cam slots engaged by the inner ends of said bars whereby rotation of said disc will shift said bars for interlocking engagement at their outer ends with said hub structure to thereby secure the cap thereto, and key controlled means operable from the exterior of said cap for rotating said disc.

2. In combination, a wheel hub having a cap receiving opening in its outer wall, a cap structure having a flange for extending through said opening, guide brackets supported on said cap, radially shiftable lock members supported on said brackets, an actuating member having cam slots engaged by the inner ends of said locking members, a rotatable member on said cap connected with said actuating member by means of which said actuating member may be turned, and lock mechanism supported by said rotating member whereby it may be secured against rotation after said lock members have been shifted to locking position, said lock members when shifted to locking position engaging behind the outer wall of the hub to thereby lock the cap structure against removal.

3. In combination a wheel hub having an opening, a hub cap having a flange for extending through said opening, radially shiftable lock members supported on said cap and said cap flange having guide passageways for the ends of said locking members, an actuating member adapted upon rotational movement to cause radial shift of said locking members to locking or unlocking position, the outer ends of said locking members when in locking position being projected behind the hub wall surrounding the hub opening whereby to lock the cap to the hub, a housing supported by said cap, a rotatable member journalled in said housing and connected with said locking bar actuating member, and means for locking said rotational member against rotation after actuation thereby of said actuating member to shift said locking members into locking position.

4. The combination with a wheel hub having an opening in its outer wall, of a hub cap for closing said opening, said cap having an annular flange for extending through said hub opening, radially shiftable locking bars supported on said cap and said flange having slots for the passage therethrough of the outer ends of said bars into engagement with the rear side of the hub wall surrounding the hub opening whereby to lock the cap to the hub, a housing on said cap, a rotatable member journalled in said housing, an actuating member secured to the inner end of said rotary member and having cam connection with said locking bars whereby rotational movement of said actuating member will cause radial shift of said bars, a lock opening in said housing, and a key controlled lock bolt in said rotary member adapted to be projected into said lock opening after rotation of said rotary member to rotate said actuating member for outward shift of said locking bars into locking position.

FREDERICK A. SMITH.